(12) United States Patent
Moon et al.

(10) Patent No.: US 12,025,952 B2
(45) Date of Patent: Jul. 2, 2024

(54) HOLOGRAPHIC DISPLAY SYSTEM AND METHOD OF GENERATING HOLOGRAM

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Seokil Moon, Suwon-si (KR); Dongheon Yoo, Seoul (KR); Seungwoo Nam, Seoul (KR); Byoungho Lee, Seoul (KR); Changkun Lee, Seoul (KR); Hongseok Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 165 days.

(21) Appl. No.: 17/689,409

(22) Filed: Mar. 8, 2022

(65) Prior Publication Data

US 2022/0317626 A1    Oct. 6, 2022

(30) Foreign Application Priority Data

Mar. 30, 2021 (KR) .................. 10-2021-0041264

(51) Int. Cl.
*G03H 1/08* (2006.01)
*G03H 1/00* (2006.01)

(52) U.S. Cl.
CPC ......... *G03H 1/0808* (2013.01); *G03H 1/0005* (2013.01); *G03H 2001/0088* (2013.01); *G03H 2001/0825* (2013.01)

(58) Field of Classification Search
CPC .............. G03H 1/0808; G03H 1/0005; G03H 2001/0088; G03H 2001/0825;
(Continued)

(56) References Cited

U.S. PATENT DOCUMENTS 11,150,605 B1 * 10/2021 Xiao ...................... G06N 3/084
2006/0139711 A1    6/2006 Leister et al.
(Continued)

FOREIGN PATENT DOCUMENTS

KR    10-2022-0131741 A    9/2022

OTHER PUBLICATIONS

Ronneberger, Olaf et al., "U-Net: Convolutional Networks for Biomedical Image Segmentation", In: Navab N., Hornegger J., Wells W., Frangi A. (eds) Medical Image Computing and Computer-Assisted Intervention, MICCAI 2015, Lecture Notes in Computer Science, vol. 9351, pp. 234-241.
(Continued)

*Primary Examiner* — Susan E. Torgerson
(74) *Attorney, Agent, or Firm* — Sughrue Mion, PLLC

(57) ABSTRACT

Provided is a method of generating a hologram, the method including generating a kernel and a neural network configured to model an aberration of a holographic display device, obtaining second image data output from the neural network to which first image data obtained by propagating a first hologram based on the kernel is input, updating the kernel and the neural network based on comparing the second image data and predetermined image data, and generating a second hologram based on the kernel and the neural network.

16 Claims, 10 Drawing Sheets

(58) Field of Classification Search
CPC ......... G03H 1/2294; G03H 2001/0816; G03H 1/0486; G03H 1/0443; G03H 2226/02; G06N 3/0464; G06N 3/08
USPC .......................................................... 348/40
See application file for complete search history.

(56) References Cited

U.S. PATENT DOCUMENTS

| | | |
|---|---|---|
| 2019/0294108 A1 | 9/2019 | Ozcan et al. |
| 2019/0317451 A1 | 10/2019 | Supikov et al. |
| 2020/0192287 A1 | 6/2020 | Chakravarthula et al. |
| 2020/0264419 A1 | 8/2020 | Diederich et al. |
| 2022/0299939 A1 | 9/2022 | Moon et al. |
| 2022/0357704 A1* | 11/2022 | Supikov ................. G06V 10/60 |

OTHER PUBLICATIONS

Liu, Shujian et al., "Optimization of Phase-Only Computer-Generated Holograms Based on the Gradient Descent Method", Applied Science, Jun. 22, 2020, vol. 10, No. 4283, pp. 1-14.

\* cited by examiner

HOLOGRAPHIC DISPLAY SYSTEM AND METHOD OF GENERATING HOLOGRAM

CROSS-REFERENCE TO RELATED APPLICATION

This application claims priority to Korean Patent Application No. 10-2021-0041264, filed on Mar. 30, 2021, in the Korean Intellectual Property Office, the disclosure of which is incorporated by reference herein in its entirety.

BACKGROUND

1. Field

Example embodiments of the present disclosure relate to a method of generating a hologram and a holographic display system.

2. Description of Related Art

Holography is a technology for recording a 3-dimensional image by using an interference phenomenon caused as an object beam reflected from an object meets a reference beam. A hologram is a record of an interference pattern by holography. Holography includes analog holography and digital holography. Analog holography is a technology for directly recording an interference pattern of an object beam and a reference beam. Digital holography is a technology for generating an interference pattern between an object beam and a reference beam through digital processing.

Computer generated holography (CGH) is a type of the digital holography. In the CGH, an interference pattern is calculated by a computer to generate a hologram. A 3-dimensional image is reproduced as a holographic display device displays a hologram.

Due to an optical aberration of a holographic display device, the quality of a 3-dimensional image may be deteriorated, and a method for preventing the deterioration is needed.

SUMMARY

One or more example embodiments provide a method of generating a hologram and a holographic display system.

One or more example embodiments also provide a computer-readable recording medium having recorded thereon a program for executing the method on a computer.

The technical objects to be achieved by one or more embodiments are not limited to the technical objects as described above, and other technical problems may be inferred from the following example embodiments.

Additional aspects will be set forth in part in the description which follows and, in part, will be apparent from the description, or may be learned by practice of example embodiments of the disclosure.

According to an aspect of an example embodiment, there is provided a method of generating a hologram, the method including generating a kernel and a neural network configured to model an aberration of a holographic display device, obtaining second image data output from the neural network to which first image data obtained by propagating a first hologram based on the kernel is input, updating the kernel and the neural network based on comparing the second image data and predetermined image data, and generating a second hologram based on the kernel and the neural network.

The updating of the kernel and the neural network may include obtaining a loss function based on a difference between an intensity of the second image data and an intensity of the predetermined image data, and updating the kernel and the neural network to optimize the loss function.

The generating of the kernel and the neural network may include generating the kernel, such that an aberration corresponding to at least one hologram plane segment, which is a spatial segment of a hologram plane, is modeled, and the updating of the kernel and the neural network may include updating the kernel and the neural network, such that aberrations corresponding to an entire hologram plane are modeled.

The obtaining of the second image data may include obtaining first image segments that are spatial segments of the first image data, and obtaining the second image data output from neural networks to which the first image segments are respectively input.

The generating of the kernel and the neural network may include generating the kernel based on a Zernike polynomial.

The updating of the kernel and the neural network to optimize the loss function may include obtaining a first gradient of the loss function with respect to a Zernike coefficient of the kernel, updating the Zernike coefficient of the kernel based on the first gradient, obtaining a second gradient of the loss function with respect to weights of the neural network, and updating the weights of the neural network based on the second gradient.

In the updating of the kernel and the neural network, each time at least one of the kernel and the neural network is updated, at least one of the first image data and the second image data may be obtained based on an updated kernel and an updated neural network.

The generating of the second hologram may include obtaining fourth image data output from the neural network to which third image data obtained by propagating the second hologram based on the kernel is input, and updating the second hologram based on comparing the fourth image data and target image data, and wherein the updating of the second hologram may include obtaining a loss function based on a difference between an intensity of the fourth image data and an intensity of the target image data, and updating the second hologram to optimize the loss function.

The updating of the kernel and the neural network and the generating of the second hologram may be each repeated for a preset number of times.

According to an aspect of an example embodiment, there is provided a computer-readable recording medium having recorded thereon a program for executing a method a computer, the method including generating a kernel and a neural network configured to model an aberration of a holographic display device, obtaining second image data output from the neural network to which first image data obtained by propagating a first hologram based on the kernel is input, updating the kernel and the neural network based on comparing the second image data and predetermined image data, and generating a second hologram based on the kernel and the neural network.

According to an aspect of an example embodiment, there is provided a holographic display system including a light source configured to emit light to produce a holographic image, an optical device configured to spatially focus the holographic image, the optical device comprising a lens, a processor configured to generate a hologram used to produce the holographic image, such that an aberration of the optical device is compensated, and a spatial light modulator configured to modulate the light based on the hologram, wherein the processor is further configured to generate a kernel and a neural network configured to model an aberration of a holographic display device, obtain second image data output from the neural network to which first image data obtained by propagating a first hologram based on the kernel is input, update the kernel and the neural network based on comparing the second image data and predetermined image data, and generate a second hologram based on the kernel and the neural network.

The processor may be further configured to obtain a loss function based on a difference between an intensity of the second image data and an intensity of the predetermined image data; and update the kernel and the neural network to optimize the loss function.

The processor may be further configured to generate the kernel, such that an aberration corresponding to at least one hologram plane segment, which is a spatial segment of a hologram plane, is modeled, and update the kernel and the neural network, such that aberrations corresponding to an entire hologram plane are modeled.

The processor may be further configured to obtain first image segments that are spatial segments of the first image data, and obtain the second image data output from neural networks to which the first image segments are respectively input.

The processor may be further configured to generate the kernel based on a Zernike polynomial.

The processor may be further configured to obtain a first gradient of the loss function with respect to a Zernike coefficient of the kernel, update the Zernike coefficient of the kernel based on the first gradient, obtain a second gradient of the loss function with respect to weights of the neural network, and update the weights of the neural network based on the second gradient.

The processor may be further configured to obtain at least one of the first image data and the second image data based on an updated kernel and an updated neural network each time at least one of the kernel and the neural network is updated.

The processor may be further configured to obtain fourth image data output from the neural network to which third image data obtained by propagating the second hologram based on the kernel is input, obtain a loss function based on a difference between an intensity of the fourth image data and an intensity of target image data, and update the second hologram to optimize the loss function.

The updating of the kernel and the neural network may include obtaining a loss function based on a difference between an intensity of the second image data and an intensity of the predetermined image data, and updating the kernel and the neural network to optimize the loss function.

The generating of the kernel and the neural network may include generating the kernel, such that an aberration corresponding to at least one hologram plane segment, which is a spatial segment of a hologram plane, is modeled, and the updating of the kernel and the neural network may include updating the kernel and the neural network, such that aberrations corresponding to an entire hologram plane are modeled.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
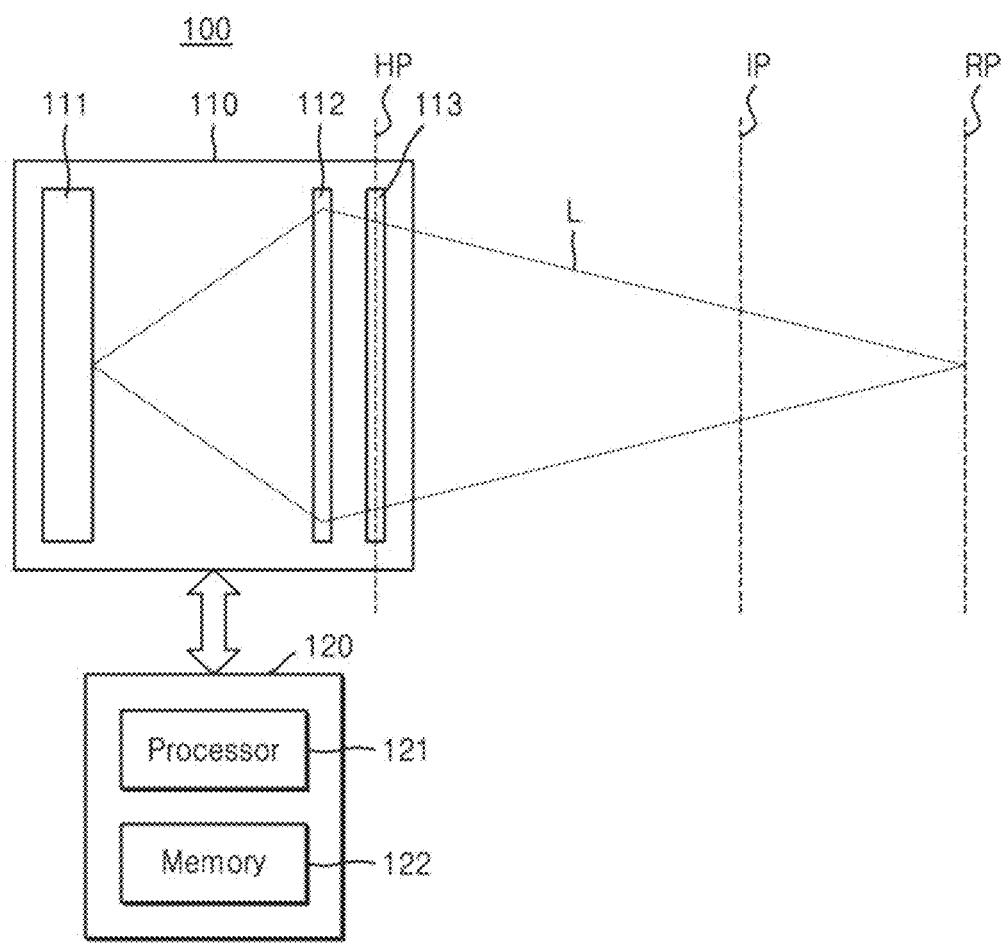
FIG. 1 is a diagram for describing a holographic display system according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terminology used in the example embodiments has selected general terms that are currently widely used as much as possible, but this may vary depending on the intention or precedent of a person skilled in the art or the appearance of new technologies. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

The terms "consisting of" or "comprising" as used in the example embodiments should not be construed to include all of the various components, or various steps described in the specification, and some of them, or It should be construed that some steps may not be included, or may further include additional components or steps.

Hereinafter, example embodiments will be described in detail with reference to the accompanying drawings. The disclosure may, however, be embodied in many different forms and should not be construed as limited to the example embodiments set forth herein.

FIG. 1 is a diagram for describing a holographic display system according to an example embodiment.

A holographic display system 100 according to an example embodiment may include a holographic display device 110 and a hologram generating device 120. The holographic display device 110 may include a light source 111, optical device 112, and a spatial light modulator 113. Also, the hologram generating device 120 may include a processor 121 and a memory 122.

The holographic display system 100 may be configured to generate a hologram and reproduce a holographic image based on a hologram plane HP located in the spatial light modulator 113, a reference plane RP located in the pupils of an observer, and an image plane IP on which the holographic image is located.

The holographic display device 110 may be configured to display a holographic image on the image plane IP based on a hologram provided from the hologram generating device 120. The image plane IP may include a plurality of layers.

The light source 111 may emit light to reproduce a holographic image. The light source 111 may include, but is not limited to, a laser diode and/or a light emitting diode. The light source 111 may be configured as an array of a plurality of light sources.

The optical device 112 may spatially focus a holographic image. In an example embodiment, the optical device 112 may be configured to spatially focus reproduction light L formed through modulation by the spatial light modulator 113. For example, the optical device 112 may be configured to focus the reproduction light L on the reference plane RP.

Optical device 112 may include a fixed focal optics with a fixed focal length and/or a variable focal optics with a variable focal length. Also, optical device 112 may include a refractive lens element and/or a diffractive lens element.

The spatial light modulator 113 may modulate light based on a hologram. The spatial light modulator 113 may form a hologram pattern for diffracting and modulating light based on a hologram provided from the hologram generating device 120. The spatial light modulator 113 may include an amplitude modulator and/or a phase modulator.

The hologram generating device 120 may generate a hologram. In an example embodiment, the hologram generating device 120 may be configured to generate a hologram based on the computer generated holography (CGH). The hologram generating device 120 may be configured to generate a hologram by compensating for aberration of the holographic display device 110. For example, the hologram generating device 120 may be configured to generate a hologram by compensating for aberration of the optical device 112.

The processor 121 may be configured to generate a hologram. The processor 121 may be implemented as an array of a plurality of logic gates or may be implemented as a combination of a general-purpose microprocessor and a memory in which programs that may be executed on the microprocessor are stored.

The processor 121 may generate a kernel and a neural network for modeling the aberration of the holographic display device 110. The processor 121 may obtain second image data from an output of a neural network to which first image data obtained by propagating a first hologram based on the kernel is input. The processor 121 may update the kernel and the neural network based on a comparison of the second image data and predetermined image data. The processor 121 may generate a second hologram based on the kernel and the neural network.

The memory 122 may be configured to store a hologram and/or programs executed by the processor 121. The memory 122 may include a random access memory (RAM), such as a dynamic random access memory (DRAM) and a static random access memory (SRAM), a read-only memory (ROM), an electrically erasable programmable read-only memory (EEPROM), a CD-ROM, a Blu-ray or another optical disc storage, a hard disk drive (HDD), a solid state drive (SSD), or a flash memory. Furthermore, the memory 122 may include other external storage devices that may be accessed by the hologram generating device 120.

Figure 2:
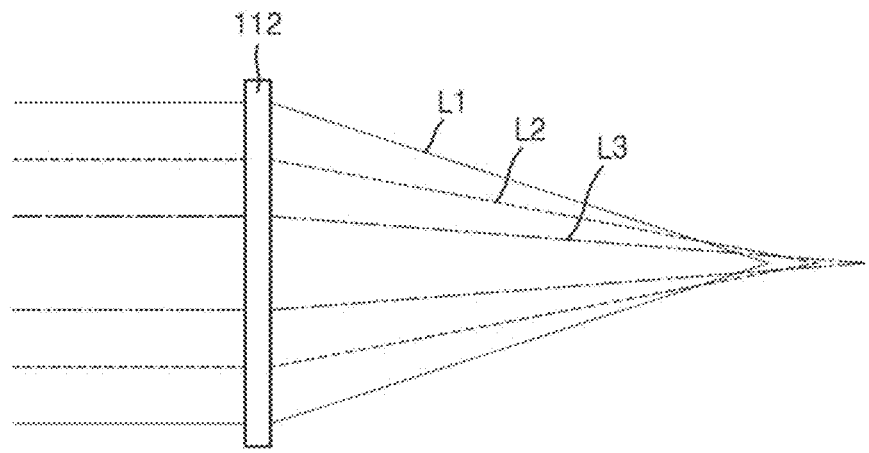
FIG. 2 is a cross-sectional view showing an example of an aberration of optics.

FIG. 2 is a cross-sectional view showing an example of an aberration of optics.

An aberration may exist in a holographic display device. Here, an aberration refers to all optical aberrations that may occur due to wave characteristics of light and/or a holographic display device. For example, an aberration may include, but is not limited to, spherical aberration, astigmatism, coma, distortion, and curvature of field.

For example, positions of focal points of light beams L1, L2, and L3 diffracted by the optical device 112 may be different from one another due to a spherical aberration. Since an unclear holographic image may be reproduced due to an aberration, a method of compensating for aberration is needed.

Figure 3:
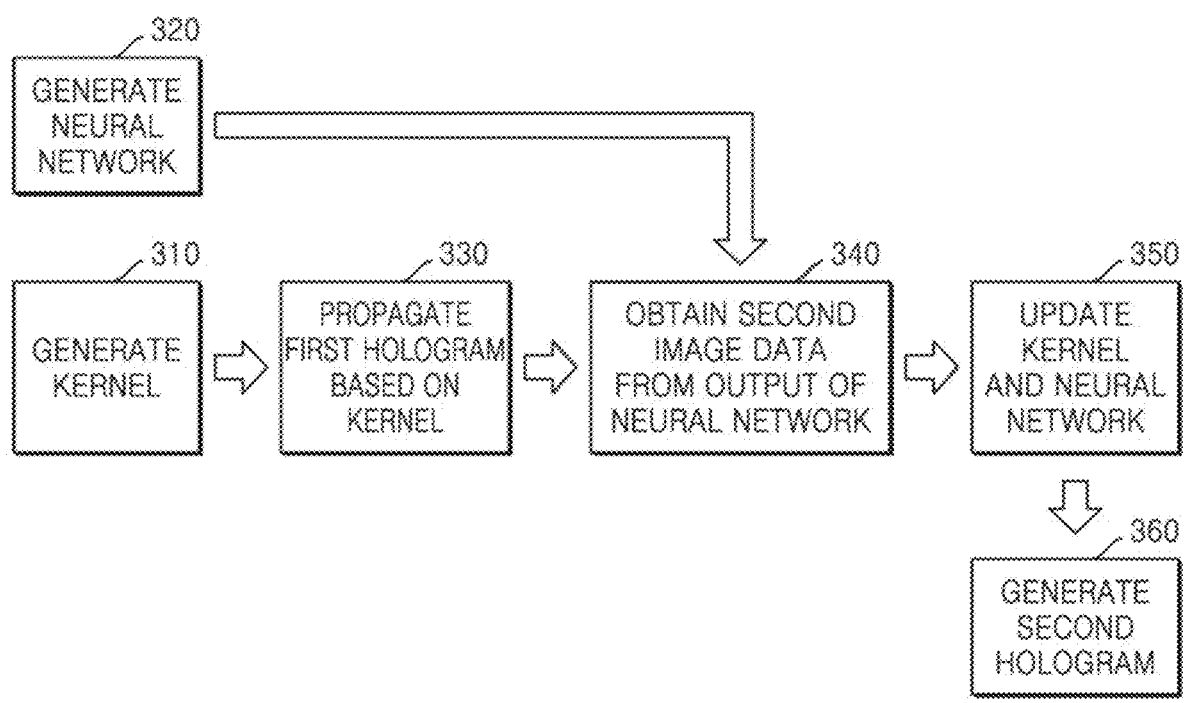
FIG. 3 is a diagram for describing a method of generating a hologram according to an example embodiment.

FIG. 3 is a diagram for describing a method of generating a hologram according to an example embodiment.

In operation 310, a processor (e.g., the processor 121 of FIG. 1) may generate a kernel. An aberration of a holographic display device may appear on a hologram plane. The processor may generate a kernel, such that the aberration of the holographic display device is modeled. The processor may generate a kernel, such that an aberration corresponding to at least one hologram plane segment, which is a spatial segment of the hologram plane, is modeled. The processor may generate a kernel, such that aberrations corresponding to all spatial segments of the hologram plane are modeled identically. For example, the processor may generate a kernel, such that the aberration of the center of an optics, which is an aberration corresponding to one hologram plane segment, is modeled. A Zernike polynomial may be used to model an aberration.

In operation 320, the processor 121 may generate a neural network. The neural network may include, but is not necessarily limited to, a convolutional neural network (CNN), a deep neural network (DNN), or a recurrent neural network (RNN). A neural network may include weights, and initial weights may be set randomly. An aberration of a holographic display device may not appear uniformly on the hologram plane. In order to model an aberration more accurately, it is necessary to model aberrations respectively corresponding to all spatial segments of the hologram plane. To this end, the processor may update the neural network, such that aberrations corresponding to the entire hologram plane are modeled. By using a neural network, calculations may be performed quickly to reflect an aberration corresponding to a spatial domain.

In operation 330, the processor 121 may propagate a first hologram based on the kernel. The processor 121 may propagate the first hologram by reflecting an aberration. The first hologram may refer to an arbitrary hologram used to update the kernel and the neural network. An aberration corresponding to one hologram plane segment is modeled in one kernel. Therefore, by propagating the first hologram using one kernel, the first hologram may be propagated by reflecting the same aberration to all hologram plane segments. As the first hologram is propagated, first image data may be generated.

In operation 340, the processor 121 may obtain second image data from an output of the neural network. The second image data may refer to an output of a neural network to which the first image data is input. The first image data and the second image data may refer to image data generated based on the first hologram. The processor 121 may update the neural network, such that aberrations corresponding to the entire hologram plane are modeled. Aberrations corresponding to the entire hologram plane may be reflected in the second image data by the neural network. The aberrations corresponding to the entire hologram plane may correspond to aberrations corresponding to all spatial regions of the second image data.

In operation 350, the processor 121 may update the kernel and the neural network. The processor 121 may update the kernel and the neural network, such that aberrations corresponding to the entire hologram plane are modeled. The processor 121 may update the kernel and the neural network based on a comparison of the second image data and predetermined image data. The predetermined image data may be generated by propagating the first hologram based on an actual holographic display device. The processor 121 may update weights of the neural network, such that the aberrations corresponding to the entire hologram plane are modeled.

The kernel and the neural network may be updated by using a loss function. In an example embodiment, the loss function may be calculated based on a difference between the intensity of the second image data and the intensity of the predetermined image data. For optimization of the loss function, which minimizes the loss, the processor 121 may repeat operations 330 to 350 by using an updated kernel and an updated neural network. By updating the kernel and the neural network by repeating operations 330 to 350, a final kernel and a final neural network may be generated.

In operation 360, the processor 121 may generate a second hologram. The second hologram may be generated using a kernel and a neural network. The second hologram is a hologram to be generated, and the second hologram may be the same as or different from the first hologram. The second hologram may be generated based on a final kernel and a final neural network.

The processor 121 may obtain third image data by propagating the second hologram based on the kernel and may obtain fourth image data from an output of a neural network to which the third image data is input. The third image data and the fourth image data may refer to image data generated based on the second hologram. The third image data may be image data generated by propagating the second hologram based on the final kernel, and the fourth image data may be image data obtained from an output of a final neural network that receives the third image data as an input.

The processor 121 may update the second hologram based on a comparison of the fourth image data and target image data. The second hologram may be updated by using a loss function. In an example embodiment, a loss function may be calculated based on a difference between the intensity of the fourth image data and the intensity of the target image data. By updating the second hologram to optimize the loss function, a final second hologram may be generated.

Figure 4:
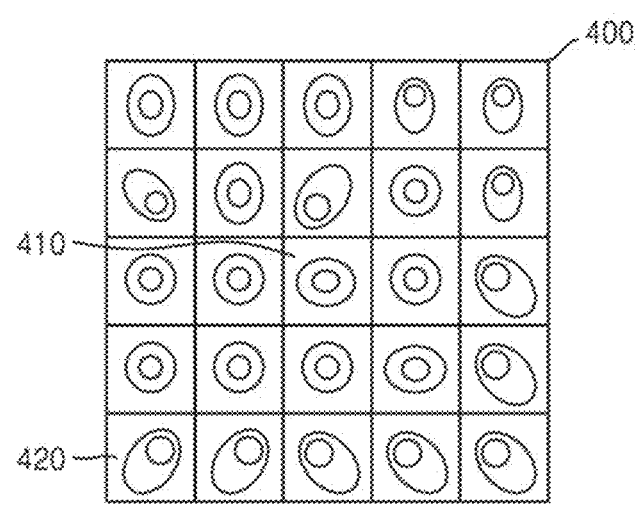
FIG. 4 is a diagram showing patterns formed on hologram plane segments due to aberrations according to an example embodiment.

FIG. 4 is a diagram showing patterns formed on hologram plane segments due to aberrations according to an example embodiment.

A hologram plane 400 may be divided into hologram plane segments that are spatial regions of the hologram plane. FIG. 4 shows an example in which the hologram plane 400 is divided into a 5×5 array of hologram plane segments. The hologram plane 400 may include hologram plane segments of various numbers and sizes.

An aberration of the holographic display device may not uniformly affect the hologram plane 400 spatially. Therefore, when light is propagated from each point light source to each hologram plane segment, different patterns may appear in the hologram plane segments.

A processor (e.g., the processor 121 of FIG. 1) may generate an arbitrarily modeled kernel. In an example embodiment, the processor 121 may generate a kernel in which an aberration corresponding to at least one hologram plane segment from among hologram plane segments is modeled. The processor 121 may update a kernel and a neural network, such that modeling of an aberration by the kernel is upgraded to modeling of an aberration corresponding to an entire hologram plane. Since a kernel may be generated without considering the aberration corresponding to the entire hologram plane, the kernel may be created within a short time. In addition, since the aberration corresponding to the entire hologram plane may be modeled by using the neural network, the aberration corresponding to the entire hologram plane may be modeled with high accuracy. By using a kernel to reflect the same aberration to hologram plane segments and using a neural network to reflect aberrations corresponding to the respective hologram plane segments, the aberrations corresponding to the respective hologram plane segment may be more quickly modeled and with high accuracy.

The processor 121 may generate a kernel in which the aberration corresponding to one of the hologram plane segments is modeled. For example, the processor 121 may generate a kernel in which the aberration of the central aberration of the optics corresponding to the aberration corresponding to the hologram plane segment 410 is modeled. In another example, the processor 121 may generate a kernel in which an aberration of the outer portion of an optics, which is an aberration corresponding to a hologram plane segment 420, is modeled.

The processor 121 may model an aberration corresponding to one from among hologram plane segments by using a Zernike polynomial and generate a kernel based on the Zernike polynomial. In an example embodiment, the kernel may be modeled by Equation 1 below.

$$h_i = B(r) W_i$$

$$K(\theta_{zer}) = \exp(jkr)\exp(j\pi\Sigma(\theta_{zer,i} * Z_i)) \qquad \text{[Equation 1]}$$

In Equation 1, $\theta_{zer,i}$ may denote a coefficient of an i-th Zernike polynomial, $Z_i$ may denote the i-th Zernike polynomial, $K(\theta_{zer})$ may denote a kernel generated based on the Zernike polynomial and the Zernike coefficient, r may denote a propagation distance, and k may denote a wavenumber. $\exp(jkr)$ may refer to a function that models optical propagation by a spherical wave, and $\exp(j\pi\Sigma(\theta_{zer,i} * Z_i))$ denotes a function in which a wavefront is modeled by an aberration corresponding to one from among hologram plane segments.

In Equation 1, i represents an index of a Zernike polynomial. The index of a Zernike polynomial may be determined by various criteria. For example, the index of a Zernike polynomial may be an OSA/ANSI index, a Fringe index, a Noll index, a Wyant index, etc.

Table 1 shows examples of a Zernike polynomial according to Wyant indices.

TABLE 1

| i | Z |
|---|---|
| 0 | 1 |
| 1 | $\rho\cos\theta$ |
| 2 | $\rho\sin\theta$ |
| 3 | $2\rho^2 - 1$ |
| 4 | $\rho^2\cos2\theta$ |
| 5 | $\rho^2\sin2\theta$ |
| 6 | $(3\rho^3 - 2\rho)\cos\theta$ |
| 7 | $(3\rho^3 - 2\rho)\sin\theta$ |
| 8 | $6\rho^4 - 6\rho^2 + 1$ |
| 9 | $\rho^3\cos3\theta$ |

In Table 1, $\theta$ denotes an azimuthal angle, and $\rho$ denotes a radial distance. As a Zernike polynomial is configured by using higher indices, more complicated wavefronts may be modeled. The processor 121 may be configured to determine indices and coefficients of a Zernike polynomial by using a program that analyzes aberrations. Alternatively, the processor 121 may generate a kernel by obtaining indices and coefficients of a Zernike polynomial from a user input.

The processor 121 may update the neural network, such that aberrations corresponding to the entire hologram plane are modeled. The processor 121 may also update the neural network, such that aberrations corresponding to respective hologram plane segments are modeled. For example, the processor 121 may update the neural network, such that aberrations respectively corresponding to the hologram plane segment 410 and the hologram plane segment 420 are modeled.

The processor 121 may update the neural network, such that an aberration corresponding to at least one from among hologram plane segments is modeled. Aberrations corresponding to the respective hologram plane segments may be reflected in first image data by the neural network, and thus second image data may be generated. The aberrations corresponding to the respective hologram plane segments may correspond to aberrations corresponding to respective second image segments. The second image data may be divided into second image segments that are spatial segments, and at least a portion of the second image data may refer to at least one of the second image segments. Aberrations corresponding to the respective second image segments may be reflected in first image data by the neural network, and thus second image data may be generated.

Figure 5:
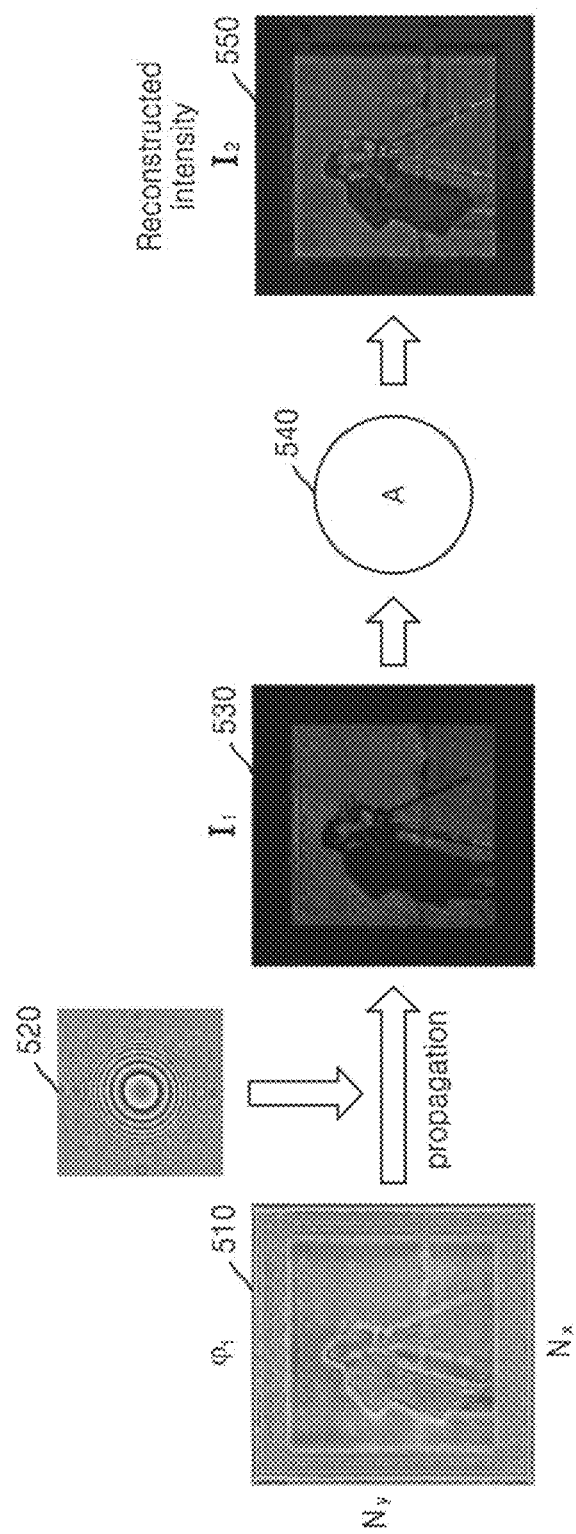
FIG. 5 is a diagram for describing image data according to an example embodiment.

FIG. 5 is a diagram for describing image data according to an example embodiment.

Referring to FIG. 5, a first hologram 510 may be propagated based on a kernel 520. As the first hologram 510 is propagated, first image data 530 may be generated.

The first image data 530 may be divided into first image segments that are spatial segments. Since an aberration corresponding to at least one hologram plane segment is modeled in one kernel, the same aberration may be reflected in first image segments generated by propagating the first hologram by using one kernel. For example, an aberration of the center of an optical device may be equally reflected in the first image segments.

When the first image data 530 is input to a neural network 540, second image data 550 may be obtained from an output of the neural network 540. Aberrations corresponding to the entire hologram plane may be reflected in the first image data 530 by the neural network. For example, aberrations corresponding to respective hologram plane segments may be reflected in the first image data 530. The second image data 550 may be generated by reflecting aberrations corresponding to the entire hologram plane in the first image data 530. Since aberrations corresponding to the entire hologram plane may be reflected in the neural network 540, an aberration of a holographic display device reflected in the second image data 550 may be more similar to the aberration of the holographic display device than an aberration of the holographic display device reflected in the first image data 530.

Figure 6:
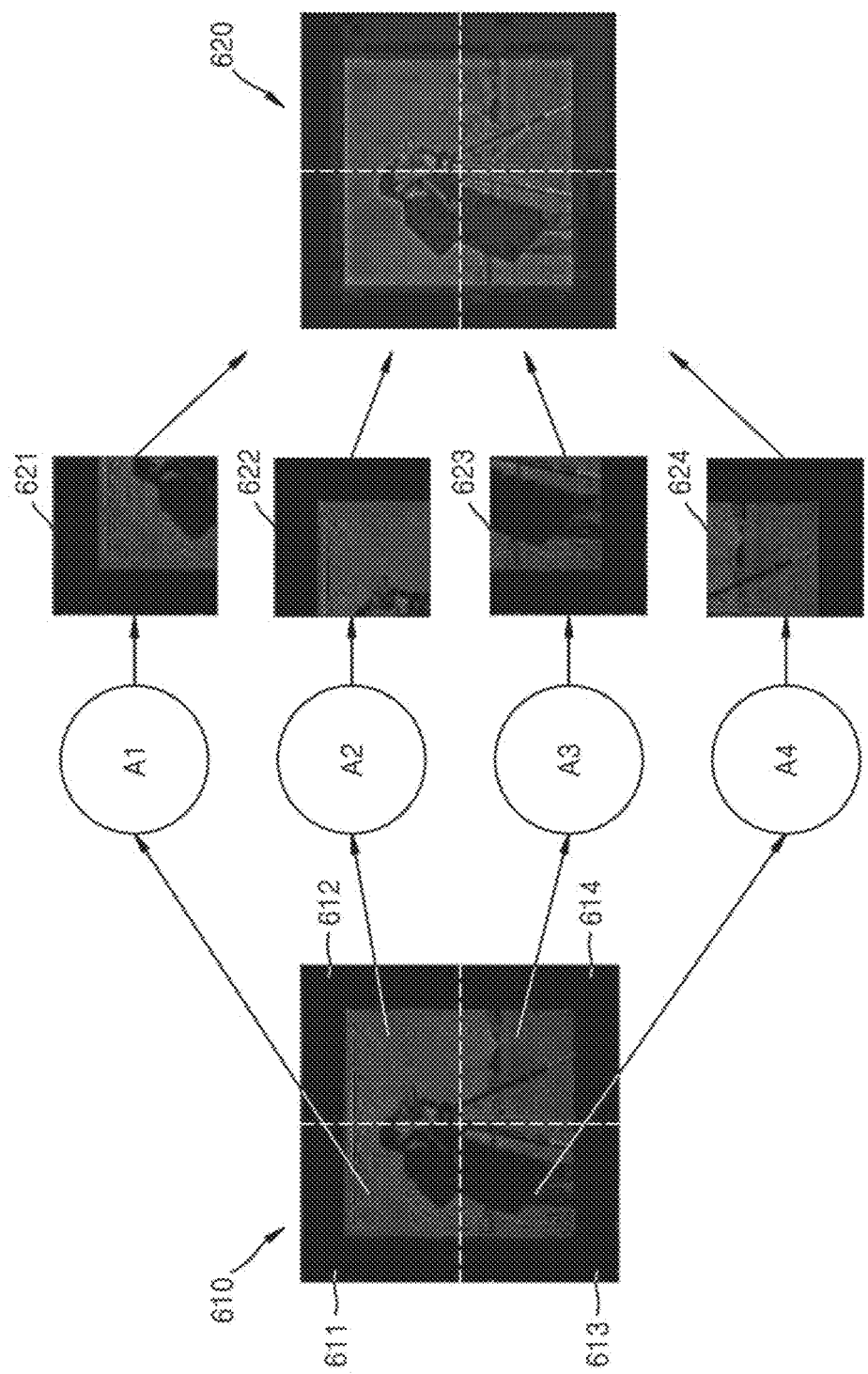
FIG. 6 is a diagram for describing a neural network according to an example embodiment.

FIG. 6 is a diagram for describing a neural network according to an example embodiment.

A processor (e.g., the processor 121 of FIG. 1) may obtain a plurality of first image segments 611, 612, 613, and 614 that are spatial segments of first image data 610. Although FIG. 6 shows that the first image data 610 is divided into four first image segments 611, 612, 613, and 614, embodiments are not limited thereto, and the number of image segments of the first image data 610 may vary. The aberrations reflected in the first image segments 611, 612, 613, and 614 may be the same.

The first image segments 611, 612, 613, and 614 may be input to neural networks A1, A2, A3, and A4, respectively. For example, a first image segment 611 may be input to a neural network A1, a first image segment 612 may be input to a neural network A2, a first image segment 613 may be input to a neural network A3, and a first image segment 614 may be input to a neural network A4.

Aberrations respectively corresponding to second image segments 621, 622, 623, and 624, which are aberrations corresponding to respective hologram plane segments, may be reflected in the first image segments 611, 612, 613, and 614 by the neural networks A1, A2, A3, and A4. For example, the neural network A1 may output a second image segment 621 by reflecting an aberration corresponding to the second image segment 621 in the first image segment 611. The neural network A2 may output a second image segment 622 by reflecting an aberration corresponding to the second image segment 622 in the first image segment 612. Aberrations respectively corresponding to the second image segments 621, 622, 623, and 624 may be different from one another.

The processor 121 may generate merged second image data 620 by merging a plurality of second image segments 621, 622, 623, and 624.

In an example embodiment, the neural networks A1, A2, A3, and A4 may be updated. The processor 121 may update weights of the neural networks A1, A2, A3, and A4, such that the aberrations corresponding to the entire hologram plane are modeled. For example, the neural networks A1, A2, A3, and A4 may be updated by comparing the second image segments 621, 622, 623, and 624 with image segments of predetermined image data, respectively. In another example, the neural networks A1, A2, A3, and A4 may each be updated based on a comparison of the second image data 620 with predetermined image data.

As the first image segments 611, 612, 613, and 614 are respectively input to the neural networks A1, A2, A3, and A4, the first image segments 611, 612, 613, and 614 may be processed in parallel. By processing the first image segments 611, 612, 613, and 614 in parallel, the speed at which the second image data 620 is generated and the speed at which the neural networks A1, A2, A3, and A4 are updated may be improved.

Figure 7:
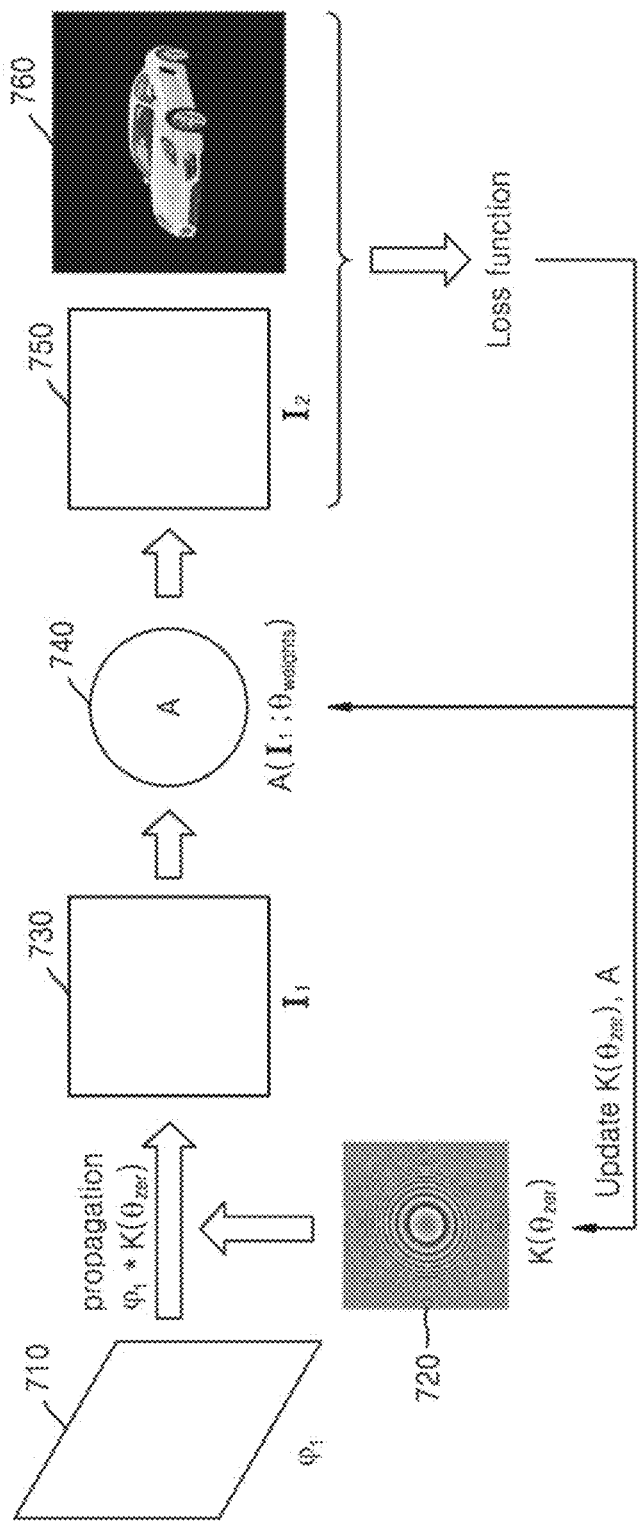
FIG. 7 is a diagram showing a method of updating a kernel and a neural network according to an example embodiment.

FIG. 7 is a diagram showing a method of updating a kernel and a neural network according to an example embodiment.

Referring to FIG. 7, an optimization loop for updating a kernel and a neural network may be formed. A processor (e.g., the processor 121 of FIG. 1) may generate a first hologram 710. The first hologram 710 may include random phase data and amplitude data. Also, the processor 121 may generate a kernel 720 and a neural network 740. The initial Zernike coefficient ($\theta_{zer}$) for generating the kernel 720 and initial neural network weights ($\theta_{weights}$) for forming the neural network 740 may be randomly generated.

The processor 121 may generate first image data 730 by propagating the first hologram 710 by using the kernel 720. Propagation may be performed through a convolution operation between the first hologram 710 and the kernel 720. In an example embodiment, propagation may be performed through a spatially invariant convolution operation between the first hologram 710 and the kernel 720. Spatial invariant convolution may be calculated using a Fast Fourier Transform (FFT). Since an aberration corresponding to at least one hologram plane segment is modeled in the kernel 720, the first hologram 710 may be propagated by reflecting an aberration corresponding to a hologram plane segment as the first hologram 710 is propagated based on the one kernel 720. For example, the first hologram 710 may be propagated by reflecting an aberration of the center of an optical device, which is an aberration corresponding to one hologram plane segment.

The processor 121 may obtain second image data 750 from an output of the neural network 740 to which the first image data 730 is input. The processor 121 may update the neural network 740, such that aberrations corresponding to the entire hologram plane are modeled. The aberrations corresponding to the entire hologram plane may correspond to aberrations corresponding to the entire region of the second image data 750. The second image data 750 may be generated by reflecting the aberration corresponding to the entire hologram plane in the first image data 730 by the neural network 740.

The processor 121 may update the kernel 720 and the neural network 740 to optimize a loss function defined by a difference between the second image data 750 and predetermined image data 760. The predetermined image data may be generated by propagating the first hologram based on an actual holographic display device.

The loss function may be defined by a difference between the intensity of the second image data 750 and the intensity of the predetermined image data 760. The loss function may be defined by a root mean square of a difference between the intensity of the second image data 750 and the intensity of the predetermined image data 760. In an example embodiment, the loss function may be defined as shown in Equation 2.

$$L=|I_e-I_2|^2 \qquad \text{[Equation 2]}$$

In Equation 2, L may denote a loss function, $I_c$ may denote the intensity of the predetermined image data 760, and $I_2$ may denote the intensity of the second image data 750.

The kernel 720 may be updated by updating the Zernike coefficient $\theta_{zer}$.

In an example embodiment, the Zernike coefficient $\theta_{zer}$ may be updated based on Equation 3.

$$\theta_{zer} = \theta_{zer} - \left(\frac{\partial L}{\partial \theta_{zer}}\right) \qquad \text{[Equation 3]}$$

A first gradient of a loss function may be determined for the Zernike coefficient $\theta_{zer}$ of the kernel 720. The first gradient may be determined by $$\frac{\partial L}{\partial \theta_{zer}}$$

of Equation 3. Accordingly, the Zernike coefficient $\theta_{zer}$ may be updated based on the first gradient, and the kernel 720 may be updated. The kernel 720 may be updated, such that an aberration corresponding to a region of a hologram plane is accurately modeled.

The neural network 740 may be updated by updating neural network weights $\theta_{weights}$.

In an example embodiment, the neural network weights $\theta_{weights}$ may be updated based on Equation 4.

$$\theta_{weights} = \theta_{weights} - \left(\frac{\partial L}{\partial \theta_{weights}}\right) \qquad \text{[Equation 4]}$$

Based on Equation 4, a second gradient of the loss function for the neural network weights $\theta_{weights}$ may be determined. The second gradient may be determined by $$\frac{\partial L}{\partial \theta_{weights}}$$

of Equation 4. Therefore, the weights $\theta_{weights}$ may be updated based on the second gradient, and the neural network 740 may be updated. The neural network 740 may be updated, such that an aberration corresponding to at least a partial region of the second image data 750 is accurately modeled.

In an example embodiment, every time at least one of the kernel 720 and the neural network 740 is updated, the processor 121 may generate at least one of the first image data 730 and the second image data 750 based on the updated kernel 720 and the updated neural network 740. For example, when the kernel 720 is updated, the first image data 730 may be generated based on the updated kernel 720, and the second image data 750 may be generated based on the generated first image data 730 and the neural network 740.

In an example embodiment, the kernel 720 and the neural network 740 may be updated simultaneously. When the kernel 720 and the neural network 740 are updated simultaneously, the first image data 730 may be generated based on the updated kernel 720, and the second image data 750 may be generated based on the generated first image data 730 and the updated neural network 740.

In another example embodiment, the kernel 720 and the neural network 740 may be sequentially updated. The kernel 720 may be updated based on a loss function, the first image data 730 may be generated based on the updated kernel 720, and the second image data 750 may be generated based on the generated first image data 730 and the neural network 740. The neural network 740 may be updated based on a loss function defined by a difference between the generated second image data 750 and the predetermined image data 760.

The Zernike coefficient $\theta_{zer}$ and the weights $\theta_{weights}$ may be updated to optimize the loss function defined by the difference between the second image data 750 and the predetermined image data 760, and thus a final Zernike coefficient $\theta_{zer}$ and final weights $\theta_{weights}$ may be generated. The final kernel 720 and the final neural network 740 may be generated based on the generated final Zernike coefficient $\theta_{zer}$ and the final weights $\theta_{weights}$.

Figure 8:
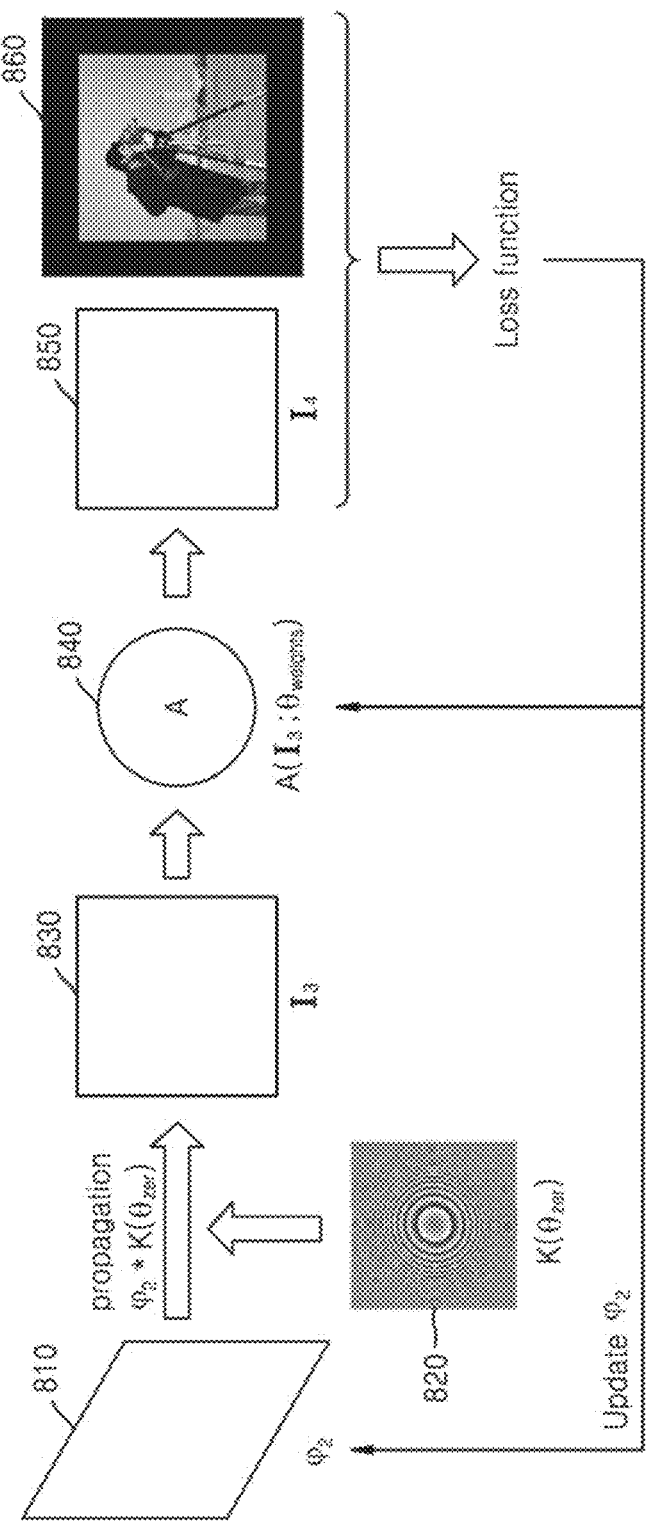
FIG. 8 is a diagram showing a method of updating a second hologram according to an example embodiment.

FIG. 8 is a diagram showing a method of updating a second hologram according to an example embodiment.

Referring to FIG. 8, an optimization loop for updating a second hologram may be formed. A processor (e.g., the processor 121 of FIG. 1) may generate a final kernel 820 and a final neural network 840. The processor 121 may also include a second hologram 810 including phase data and amplitude data. By using the final kernel 820 and the final neural network 840, an aberration of a holographic display device may be more accurately reflected.

The processor 121 may generate third image data 830 by propagating the second hologram 810 by using the final kernel 820. Propagation may be performed through a convolution operation between the second hologram 810 and the final kernel 820. As the second hologram 810 is propagated based on one final kernel 820, the second hologram 810 may be propagated by reflecting an aberration corresponding to at least one hologram plane segment.

The processor 121 may obtain fourth image data 850 from an output of the final neural network 840 to which the third image data 830 is input. The processor 121 may update the final neural network 840, such that aberrations corresponding to the entire hologram plane are modeled. The aberrations corresponding to the entire hologram plane may correspond to aberrations corresponding to the entire region of the fourth image data 850. The fourth image data 850 may be generated by reflecting the aberration corresponding to the entire hologram plane in the third image data 830 by the final neural network 840. Based on the final kernel 820 and the final neural network 840, the aberration corresponding to the entire hologram plane may be reflected.

The processor 121 may update the second hologram 810 to optimize a loss function defined by a difference between the fourth image data 850 and target image data 860.

The loss function may be defined by a difference between the intensity of the fourth image data 850 and the intensity of the target image data 860. The loss function may be defined by a root mean square of the difference between the intensity of the fourth image data 850 and the intensity of the target image data 860. In an example embodiment, the loss function may be defined as shown in Equation 5.

$$L = |I_e - I_4|^2 \qquad \text{[Equation 5]}$$

In Equation 5, may denote a loss function, $I_e$ may denote the intensity of the target image data 860, and $I_4$ may denote the intensity of the fourth image data 850.

In an example embodiment, the second hologram 810 may be updated based on Equation 6.

$$\varphi_2 = \varphi_2 - \left(\frac{\partial L}{\partial \varphi_2}\right) \qquad \text{[Equation 6]}$$

In Equation 6, $\varphi_2$ may denote the second hologram 810, and L may denote a loss function. Based on Equation 6, the second hologram 810 may be updated. For example, only the phase data of the second hologram 810 may be updated.

Figure 9:
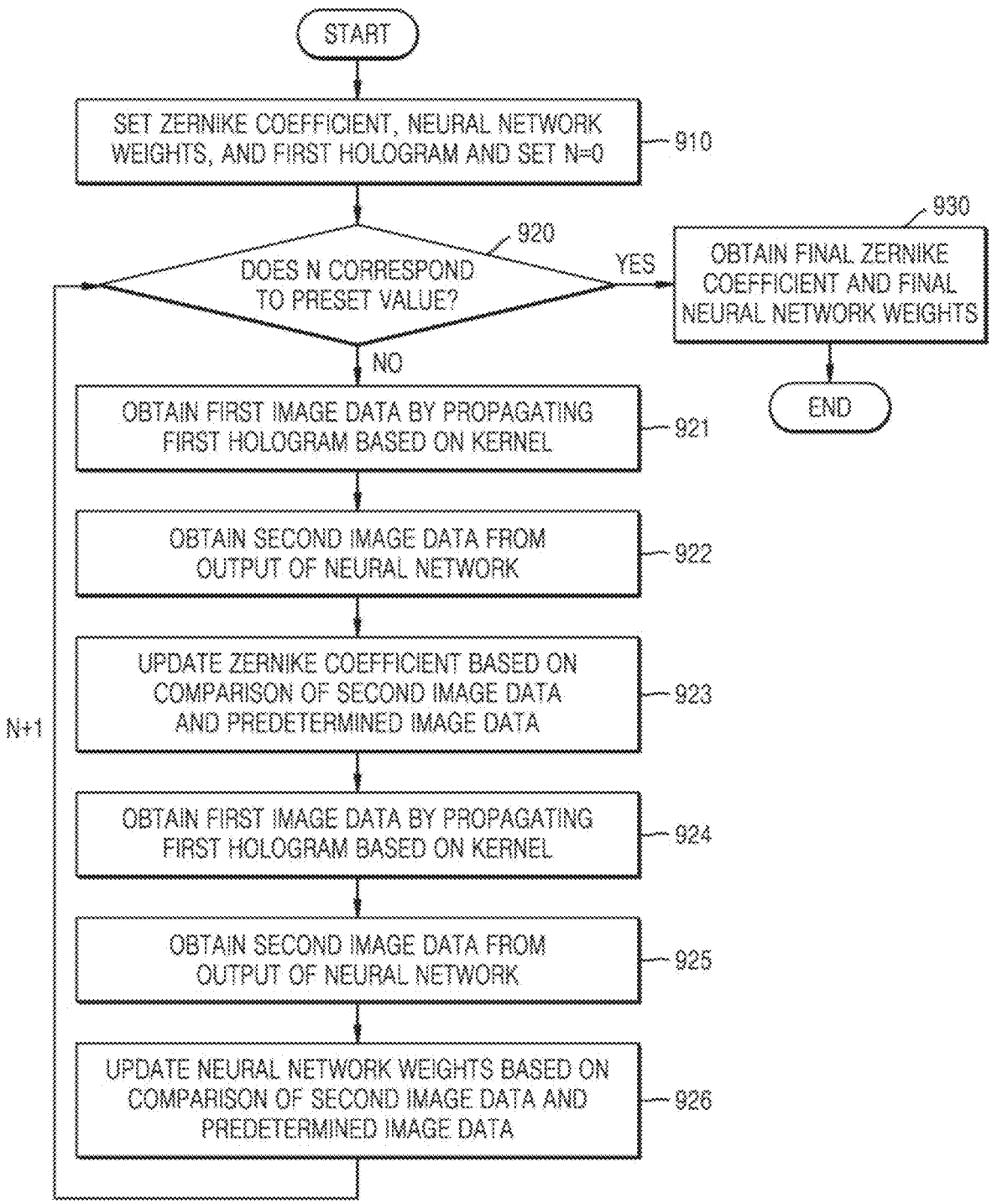
FIG. 9 is a flowchart of a method of generating a kernel and a neural network according to an example embodiment.

FIG. 9 is a flowchart of a method of generating a kernel and a neural network according to an example embodiment.

In operation 910, the processor (e.g., the processor 121 of FIG. 1) may set a Zernike coefficient, neural network weights, and a first hologram. The initial Zernike coefficient, the neural network weights, and the first hologram may be set randomly. A kernel may be generated based on the Zernike coefficient, and a neural network may be generated based on the neural network weights. The processor 121 may set n to 0. n may refer to the number of times an optimization loop is repeated to optimize a loss function defined by a difference between second image data and predetermined image data. Also, n may refer to the number of times the optimization loop is repeated until the value of the loss function becomes less than or equal to a predetermined critical value.

In operation 920, the processor 121 may determine whether n corresponds to a preset value. The preset value may refer to an appropriate number of times an optimization loop needs to be repeated for optimization of a loss function. When n does not correspond to the preset value, the processor 121 may perform operation 921. When n corresponds to the preset value, the processor 121 may perform operation 930.

In operation 921, the processor 121 may obtain first image data by propagating a first hologram based on a kernel. The processor 121 may propagate the first hologram from a hologram plane to an image plane through convolution of the kernel and the first hologram. Since an aberration is modeled in the kernel, the first hologram may be propagated by reflecting the aberration.

In operation 922, the processor 121 may obtain second image data from an output of a neural network to which the first image data is input. Since the neural network is configured to model aberrations corresponding to the entire hologram plane, the second image data may be generated by reflecting the aberrations corresponding to the entire hologram plane.

In operation 923, the processor 121 may update a Zernike coefficient based on a comparison of the second image data and predetermined image data. The processor 121 may determine a loss function based on a difference between the intensity of the second image data and the intensity of the predetermined image data and update the Zernike coefficient based on a first gradient. The kernel may be updated by updating the Zernike coefficient.

In operation 924, the processor 121 may obtain first image data by propagating a first hologram based on the kernel updated in operation 923.

In operation 925, the processor 121 may obtain second image data from an output of a neural network to which the first image data is input.

In operation 926, the processor 121 may update neural network weights based on a comparison of the second image data and predetermined image data. The processor 121 may determine a loss function based on a difference between the intensity of the second image data and the intensity of the predetermined image data and update the neural network weights based on a second gradient. As the neural network weights are updated, the neural network can be updated. Operations 920 to 926 may be repeated n times to complete an optimization.

In operation 930, the processor 121 may obtain a final Zernike coefficient and final neural network weights. A final kernel may be generated based on the final Zernike coefficient. A final neural network may be generated based on the final neural network weights.

Figure 10:
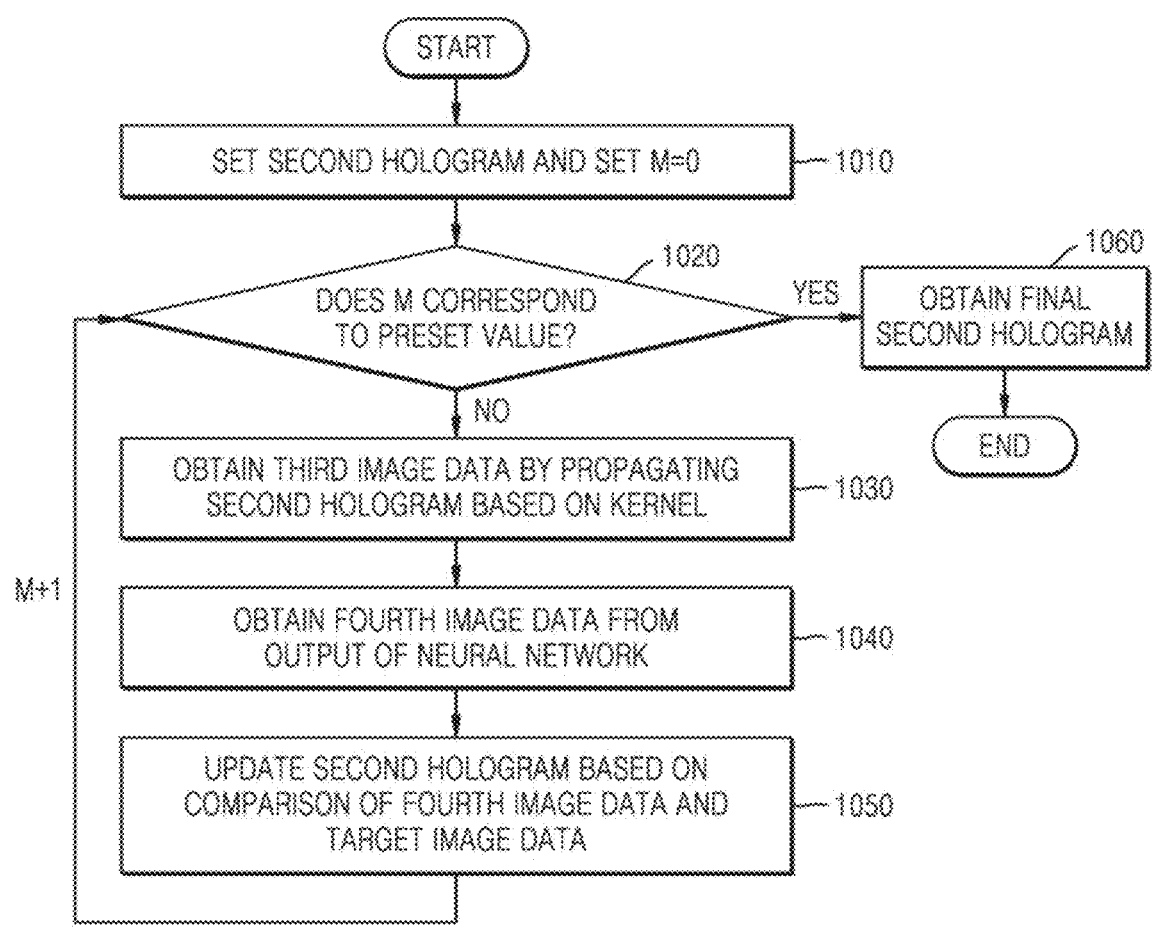
FIG. 10 is a flowchart of a method of generating a second hologram according to an example embodiment.

FIG. 10 is a flowchart of a method of generating a second hologram according to an example embodiment.

In operation 1010, a processor (e.g., the processor 121 of FIG. 1) may set a second hologram. The processor 121 may set m to 0. m may refer to the number of times an optimization loop is repeated for optimization of a loss function defined by a difference between fourth image data and target image data. Also, m may refer to the number of times the optimization loop is repeated until the value of the loss function becomes less than or equal to a predetermined critical value.

In operation 1020, the processor 121 may determine whether m corresponds to a preset number of times. The preset number of times may refer to an appropriate number of times an optimization loop needs to be repeated for optimization of a loss function. The preset number of times may be the same as or different from the preset value n of FIG. 9. When m does not correspond to the preset value, the processor 121 may perform operation 1030. When n corresponds to the preset value, the processor 121 may perform operation 1060.

In operation 1030, the processor 121 may obtain third image data by propagating a second hologram based on a kernel. The kernel used in operation 1030 may refer to the final kernel generated in operation 930 of FIG. 9. The processor 121 may propagate the second hologram from a hologram plane to an image plane through convolution of the kernel and the second hologram. Since an aberration is modeled in the kernel, the second hologram may be propagated by reflecting the aberration.

In operation 1040, the processor 121 may obtain fourth image data from an output of a neural network to which the third image data is input. The neural network used in operation 1040 may refer to the final neural network generated in operation 930 of FIG. 9. Since the neural network is configured to model aberrations corresponding to the entire hologram plane, the fourth image data may be generated by reflecting the aberrations corresponding to the entire hologram plane.

In operation 1050, the processor 121 may update the second hologram based on a comparison of the fourth image data and target image data. The processor 121 may determine a loss function based on a difference between the intensity of the fourth image data and the intensity of the target image data. Operations 1020 to 1050 may be repeated m times to complete an optimization.

In operation 1060, the processor 121 may obtain a final second hologram.

Figure 11:
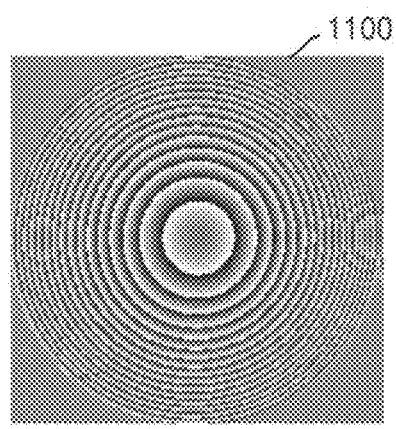
FIGS. 11 and 12 are diagrams showing experimental results of applying a method for generating a hologram according to an example embodiment.
Figure 12:
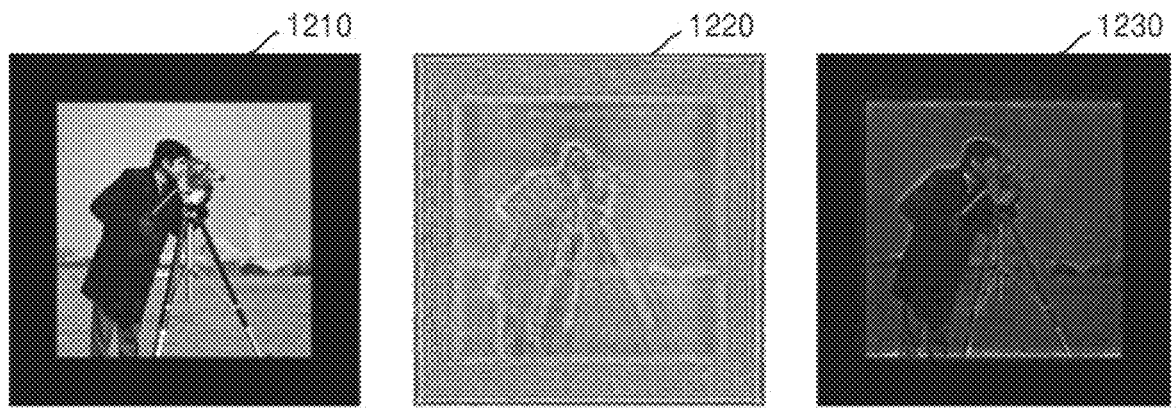

FIGS. 11 and 12 are diagrams showing experimental results of applying a method for generating a hologram according to an example embodiment.

In an experiment, a light source with a wavelength of 532 nm, target image data 1210 having 712×712 pixels, and a spatial light modulator with a pixel interval of 3.6 µm were used. Also, in the experiment, a propagation distance was set to 8 mm, and 15 coefficients were used for a kernel based on the Wyant index.

FIG. 11 shows a phase 1100 of a kernel optimized through an optimization loop.

FIG. 12 shows target image data 1210, a second hologram 1220 generated to compensate for an aberration of a holographic display device based on a method according to an example embodiment, and a holographic image 1230 reproduced by the second hologram 1220.

Referring to FIG. 12, the holographic image 1230 having superior quality compared to the target image data 1210 may be obtained. The holographic image 1230 in which no partial region is distorted by an aberration may also be obtained.

One or more example embodiments may be implemented by a computer-readable recording medium, such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium may include a computer-readable instruction, a data structure, a program module, other data of a modulated data signal, or another transmission mechanism, and an example thereof includes an arbitrary information transmission medium.

Furthermore, in the present specification, a "unit" may be a hardware component like a processor or a circuit and/or a software component executed by a hardware configuration like a processor.

While example embodiments have been particularly shown and described, it will be understood by those of ordinary skill in the art that various changes in form and details may be made therein without departing from the spirit and scope of the inventive concept as defined by the following claims. Hence, it will be understood that the example embodiments described above are not limiting the scope of the inventive concept. For example, each component described in a single type may be executed in a distributed manner, and components described distributed may also be executed in an integrated form.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A method of generating a hologram, the method comprising:
   generating a kernel and a neural network configured to model an aberration of a holographic display device;
   obtaining second image data output from the neural network to which first image data obtained by propagating a first hologram based on the kernel is input;
   updating the kernel and the neural network based on comparing the second image data and predetermined image data, the predetermined image data being generated based on propagating the first hologram by the holographic display device; and
   generating a second hologram based on the kernel and the neural network,
   wherein the updating of the kernel and the neural network comprises:
      obtaining a first gradient of a loss function with respect to a Zernike coefficient of the kernel;
      updating the Zernike coefficient of the kernel based on the first gradient;
      obtaining a second gradient of the loss function with respect to weights of the neural network; and
      updating the weights of the neural network based on the second gradient.

2. The method of claim 1, wherein the updating of the kernel and the neural network comprises:
obtaining the loss function based on a difference between an intensity of the second image data and an intensity of the predetermined image data; and
updating the kernel and the neural network to optimize the loss function.

3. The method of claim 1, wherein the generating of the kernel and the neural network comprises generating the kernel, such that an aberration corresponding to at least one hologram plane segment, which is a spatial segment of a hologram plane, is modeled, and
wherein the updating of the kernel and the neural network comprises updating the kernel and the neural network, such that aberrations corresponding to an entire hologram plane are modeled.

4. The method of claim 1, wherein the obtaining of the second image data comprises:
obtaining first image segments that are spatial segments of the first image data; and
obtaining the second image data output from neural networks to which the first image segments are respectively input.

5. The method of claim 1, wherein, in the updating of the kernel and the neural network, each time at least one of the kernels and the neural network is updated, at least one of the first image data and the second image data is obtained based on an updated kernel and an updated neural network.

6. The method of claim 1, wherein the generating of the second hologram comprises:
obtaining fourth image data output from the neural network to which third image data obtained by propagating the second hologram based on the kernel is input; and
updating the second hologram based on comparing the fourth image data and target image data, and
wherein the updating of the second hologram comprises:
obtaining the loss function based on a difference between an intensity of the fourth image data and an intensity of the target image data; and
updating the second hologram to optimize the loss function.

7. The method of claim 1, wherein the updating of the kernel and the neural network and the generating of the second hologram are each repeated for a preset number of times.

8. A non-transitory computer-readable recording medium having recorded thereon a program for executing a method a computer, the method comprising:
generating a kernel and a neural network configured to model an aberration of a holographic display device;
obtaining second image data output from the neural network to which first image data obtained by propagating a first hologram based on the kernel is input;
updating the kernel and the neural network based on comparing the second image data and predetermined image data, the predetermined image data being generated based on propagating the first hologram by the holographic display device; and
generating a second hologram based on the kernel and the neural network,
wherein the updating of the kernel and the neural network comprises:
obtaining a first gradient of a loss function with respect to a Zernike coefficient of the kernel;
updating the Zernike coefficient of the kernel based on the first gradient;
obtaining a second gradient of the loss function with respect to weights of the neural network; and
updating the weights of the neural network based on the second gradient.

9. A holographic display system comprising:
a light source configured to emit light to produce a holographic image;
an optical device configured to spatially focus the holographic image, the optical device comprising a lens;
a processor configured to generate a hologram used to produce the holographic image, such that an aberration of the optical device is compensated; and
a spatial light modulator configured to modulate the light based on the hologram,
wherein the processor is further configured to:
generate a kernel and a neural network configured to model an aberration of a holographic display device;
obtain second image data output from the neural network to which first image data obtained by propagating a first hologram based on the kernel is input;
update the kernel and the neural network based on comparing the second image data and predetermined image data, the predetermined image data being generated based on propagating the first hologram by the holographic display device; and
generate a second hologram based on the kernel and the neural network, wherein the processor is further configured to:
obtain a first gradient of a loss function with respect to a Zernike coefficient of the kernel;
update the Zernike coefficient of the kernel based on the first gradient;
obtain a second gradient of the loss function with respect to weights of the neural network; and
update the weights of the neural network based on the second gradient.

10. The holographic display system of claim 9, wherein the processor is further configured to:
obtain the loss function based on a difference between an intensity of the second image data and an intensity of the predetermined image data; and
update the kernel and the neural network to optimize the loss function.

11. The holographic display system of claim 9, wherein the processor is further configured to:
generate the kernel, such that an aberration corresponding to at least one hologram plane segment, which is a spatial segment of a hologram plane, is modeled; and
update the kernel and the neural network, such that aberrations corresponding to an entire hologram plane are modeled.

12. The holographic display system of claim 9, wherein the processor is further configured to:
obtain first image segments that are spatial segments of the first image data; and
obtain the second image data output from neural networks to which the first image segments are respectively input.

13. The holographic display system of claim 9, wherein the processor is further configured to obtain at least one of the first image data and the second image data based on an updated kernel and an updated neural network each time at least one of the kernels and the neural network is updated.

14. The holographic display system of claim 9, wherein the processor is further configured to:

obtain fourth image data output from the neural network to which third image data obtained by propagating the second hologram based on the kernel is input;

obtain the loss function based on a difference between an intensity of the fourth image data and an intensity of target image data; and update the second hologram to optimize the loss function.

15. The method of claim 8, wherein the updating of the kernel and the neural network comprises:

obtaining the loss function based on a difference between an intensity of the second image data and an intensity of the predetermined image data; and updating the kernel and the neural network to optimize the loss function.

16. The method of claim 15, wherein the generating of the kernel and the neural network comprises generating the kernel, such that an aberration corresponding to at least one hologram plane segment, which is a spatial segment of a hologram plane, is modeled, and wherein the updating of the kernel and the neural network comprises updating the kernel and the neural network, such that aberrations corresponding to an entire hologram plane are modeled.

* * * * *